US012712859B2

(12) United States Patent
Stapleton et al.

(10) Patent No.: US 12,712,859 B2
(45) Date of Patent: Aug. 18, 2026

(54) DERIVED UNIQUE KEY ATTRIBUTE-BASED TRANSLATIONS (DUKAT)

(71) Applicant: Wells Fargo Bank, N.A., San Francisco, CA (US)

(72) Inventors: Jeffrey J. Stapleton, O'Fallon, MO (US); Peter Bordow, Fountain Hills, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 33 days.

(21) Appl. No.: 18/942,222

(22) Filed: Nov. 8, 2024

(65) Prior Publication Data

US 2026/0135839 A1 May 14, 2026

(51) Int. Cl.
*H04L 9/40* (2022.01)
*H04L 9/08* (2006.01)

(52) U.S. Cl.
CPC ........ *H04L 63/0435* (2013.01); *H04L 9/0852* (2013.01)

(58) Field of Classification Search
CPC .......................... H04L 63/0435; H04L 9/0852
See application file for complete search history.

(56) References Cited

U.S. PATENT DOCUMENTS 9,270,449 B1 * 2/2016 Tribble ............... H04L 63/0435
11,539,747 B2 * 12/2022 Reddy .................. H04L 9/0822
11,930,105 B1 * 3/2024 Stapleton .............. H04L 9/0877
12,137,339 B2 * 11/2024 Parthasarathi ...... H04W 12/041
12,526,149 B2 * 1/2026 Rule ..................... H04L 9/3234
2012/0170743 A1 * 7/2012 Senese .................. H04W 12/03 380/259
2017/0338951 A1 * 11/2017 Fu ......................... H04L 9/0894
2018/0357432 A1 * 12/2018 Tang ....................... H04L 67/14
2020/0220719 A1 * 7/2020 Chaudhari ............ H04L 9/0822
2023/0283487 A1 * 9/2023 Angelo ................. H04L 9/3278 713/168
2023/0403261 A1 * 12/2023 Braun ................... H04L 9/0861
2024/0259353 A1 * 8/2024 Carter .................... G16H 40/67

FOREIGN PATENT DOCUMENTS

CN 116684093 A * 9/2023 ........... H04L 9/0852
WO WO-0075065 A2 * 12/2000 ............. B67D 7/145

OTHER PUBLICATIONS

Machine translation of CN 116684093 A, pp. 1-2 (Year: 2023).*

* cited by examiner

*Primary Examiner* — Christopher A Revak
(74) *Attorney, Agent, or Firm* — Foley & Lardner LLP

(57) ABSTRACT

The arrangements disclosed herein relate to receiving, by a key management node, a first encrypted message element which is encrypted using a first symmetric key established between the key management node and a first node, decrypting, by the key management node, the first encrypted message element using the first symmetric key to obtain a first message element of a message, encrypting, by the key management node, the first message element using a second symmetric key established between the key management node and a second node to obtain a second encrypted message element, and sending, by the key management node, the second encrypted message element.

13 Claims, 4 Drawing Sheets

| Message M | Element $m_1$ | Element $m_2$ | Element $m_3$ |
|---|---|---|---|
| Node A | $K_{A1}(m_1)$ | $K_{A2}(m_2)$ | $K_{A3}(m_3)$ |
| $M^1$ | $K_{A1}(m_1)$ | $K_{A2}(m_2)$ | $K_{A3}(m_3)$ |
| Node B | $K_{B1}(m_1)$ | - | - |
| $M^2$ | $K_{B1}(m_1)$ | $K_{A2}(m_2)$ | $K_{A3}(m_3)$ |
| Node C | $K_{C1}(m_1)$ | - | $K_{C2}(m_3)$ |
| $M^3$ | $K_{C1}(m_1)$ | $K_{A2}(m_2)$ | $K_{C2}(m_3)$ |
| Node D | $K_{D1}(m_1)$ | $K_{D2}(m_2)$ | - |

FIG. 2A

| Message M | Element $m_1$ | Element $m_2$ | Element $m_3$ |
|---|---|---|---|
| Node A | $K_{A1}(m_1)$ | $K_{A2}(m_2)$ | $K_{A3}(m_3)$ |
| $M^1$ | $K_{B1}(m_1)$ | $K_{A2}(m_2)$ | $K_{A3}(m_3)$ |
| Node B | $K_{B1}(m_1)$ | - | - |
| $M^2$ | $K_{C1}(m_1)$ | $K_{A2}(m_2)$ | $K_{C3}(m_3)$ |
| Node C | $K_{C1}(m_1)$ | - | $K_{C2}(m_3)$ |
| $M^3$ | $K_{D1}(m_1)$ | $K_{D2}(m_2)$ | $K_{C2}(m_3)$ |
| Node D | $K_{D1}(m_1)$ | $K_{D2}(m_2)$ | - |

FIG. 2B

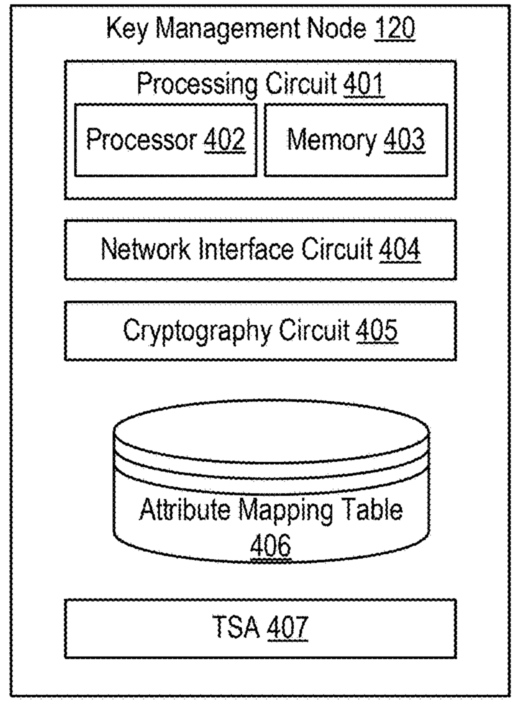
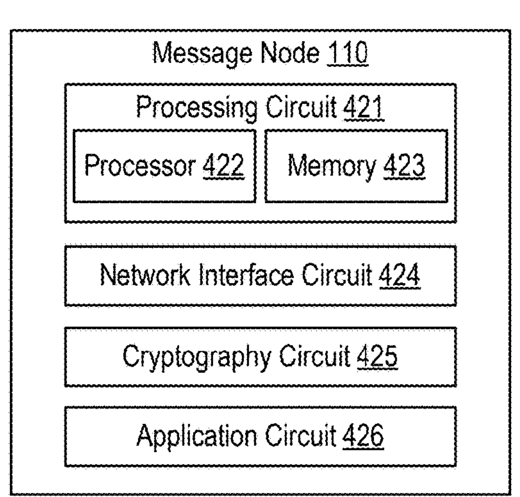
FIG. 4

DERIVED UNIQUE KEY ATTRIBUTE-BASED TRANSLATIONS (DUKAT)

BACKGROUND

Different message elements have different accessibility rules depending on the message domain and the participants'attributes. Today, each message domain can be a virtual private network operating autonomously with varying assurance levels and different cryptography and key management methods. While compartmentalization of these systems aids overall security, the cryptography and key management methods have varying assurance levels that need to be elevated to a high assurance level.

SUMMARY

The arrangements disclosed herein relate to receiving, by a key management node, a first encrypted message element which is encrypted using a first symmetric key established between the key management node and a first node, decrypting, by the key management node, the first encrypted message element using the first symmetric key to obtain a first message element of a message, encrypting, by the key management node, the first message element using a second symmetric key established between the key management node and a second node to obtain a second encrypted message element, and sending, by the key management node, the second encrypted message element.

These and other features, together with the organization and manner of operation thereof, will become apparent from the following detailed description when taken in conjunction with the accompanying drawings.

BRIEF DESCRIPTION OF THE DRAWINGS

FIG. 2A is a table illustrating example contents of the messages communicated among the message nodes and the key management node as shown in FIG. 1A, according to various arrangements.

FIG. 2B is a table illustrating example contents of the messages communicated among the message nodes and the key management node as shown in FIG. 1B, according to various arrangements.

FIG. 4 illustrates block diagrams of an example key management node and an example message node, according to some arrangements.

DETAILED DESCRIPTION

Figure 1A:
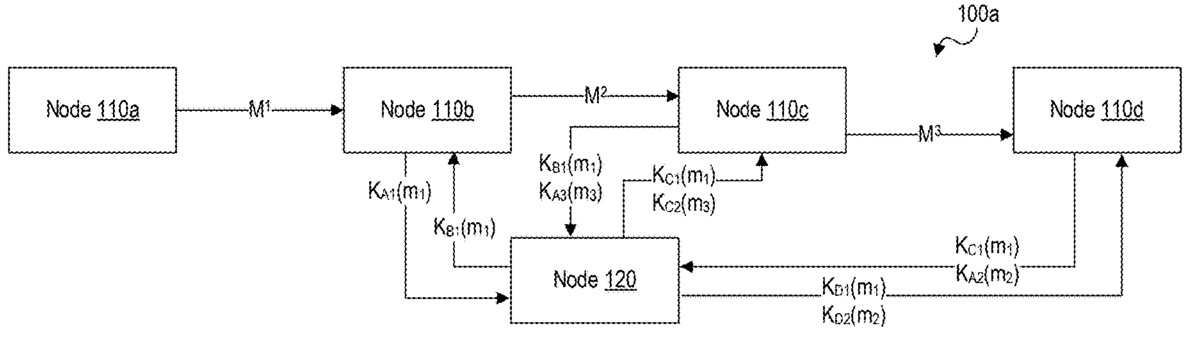
FIG. 1A is a diagram illustrating an example method for exchanging message elements via a key management node, according to various arrangments.

A Personal Identification Number (PIN) can be used in a transaction consummated using payment card. The payment card industry rules for PIN include aspects such as encryption, translation, and verification. PIN-based authentication in a transaction involving a payment card typically involves an issuer, cardholder, merchant, acquirer, and payment network. The issuer is the cardholder's financial institution, providing a payment card and establishing the PIN with the cardholder. The issuer also receives authorization request from a payment network for PIN verification. The cardholder uses the payment card at a merchant location or an online merchant page/site and enters the PIN into a user interface such as an PIN Encryption Pad (PED) which immediately encrypts the PIN. The merchant sends an authorization request to its acquirer along with the encrypted PIN using a PIN Encryption Key (PEK) $K_1$ established between the merchant and the acquirer—$K_1$(PIN) The acquirer is the merchant's financial institution, providing authorization and ultimately payment to the merchant. Acquirers and issuers communicate over payment networks. For example, the acquirer forwards the authorization request to the payment network with the encrypted PIN using another PEK $K_2$ established between the Acquirer and Network—$K_2$(PIN). The payment network routes the authorization request to the issuer with the encrypted PIN using a different PEK $K_3$ established between the network and the issuer—$K_3$(PIN).

The PIN is encrypted by the merchant at the point of entry (e.g., at the PED) and remains encrypted until the issuer can verify the PIN. Accordingly, the acquirer and the network perform a PIN translation. The encrypted PIN is sent to the Hardware Security Module (HSM), decrypted inside the HSM, re-encrypted inside the HSM, and returned to the acquirer or the network such that the PIN is never cleartext outside of the HSM except when the cardholder manually enters the PIN. Thus, only the cardholder needs to know the PIN and none of the other payment participants, merchant, acquirer, network, or even the issuer needs access to the cleartext PIN. However, the merchant and acquirer, the acquirer and the network, and the network and the issuer are required to synchronize the various PEKs amongst themselves, for example, by establishing separate Key Encryption Keys (KEKs) between the participating pairs and changing PEKs according to the operating rules of the various participants. In some examples, typical network rules mandate that the PEK is changed every 1,500 transactions or hourly, whichever occurs first.

The Primary Account Number (PAN) is a 12-19 digit number associated with a payment card. The protection of the PAN during an authorization request is point-to-point encryption, between each participant, whereas the protection of the PIN is end-to-end encryption, from the merchant to the issuer. The issuer is the cardholder's financial institution, providing a payment card with PAN to the cardholder. The issuer also receives authorization request from a payment network for purchase approval, based on the transaction amount, aggregate amount, transaction frequency, merchant location, and other proprietary risk criteria. The cardholder uses the payment card at a merchant location and swipes, inserts, or taps the card using a Point-of-Sale (POS) terminal. The cardholder might use the payment card at an online merchant page/site and manually enters the card information. The merchant sends an authorization request to the acquirer along with the encrypted PAN using an encryption key ($K_1$) established between the merchant and the acquirer—$K_1$(PAN). The acquirer is the merchant's financial institution and ultimately provides payment to the merchant. Acquirers and issuers communicate over payment networks, so the acquirer forwards the authorization request to the payment network with the encrypted PAN using another key $K_2$ established between the acquirer and network—$K_2$ (PAN). Some acquirers have access to multiple networks, so the acquirer can route the authorization request based on the PAN. The network routes the authorization request based on the PAN to the appropriate issuer with the encrypted PAN using a different key $K_3$ established between the network and issuer—$K_3$(PAN).

PAN encryption is point-to-point among any two of merchant, acquirer, payment network, and issuer, to protect the PAN during transmission, but not during processing by each participant. PAN-based routing uses the Bank Institution Number (BIN) which is the first six digits of the PAN, assigned by the American Bankers Association (ABA) to issuers, but has been expanded by the ISO 7812 standard to the first eight digits. Further, PAN encryption recommends but does not require HSM.

Protected Healthcare Information (PHI) is another data category that needs encryption during transmission. Many conventional implementations of PHI protection rely on security protocols such as Transport Layer Security (TLS) to encrypt whole data packets, compromising the message or file without regard to the actual PHI elements. Such encryption is point-to-point and basically all or nothing. PHI encryption may eventually use more granular data-element specific cryptographic keys, similar to PIN and PAN encryption. Currently, the healthcare industry is migrating to a newer ISO 20022 messages.

Personally Identifiable Information (PII) is another data category that needs encryption during transmission. Currently, most organizations privacy practices are immature to address PII encryption. PII encryption may eventually use granular data-element specific cryptographic keys, a likely outcome from the ISO 20022 efforts.

The arrangements disclosed herein relate to systems, apparatuses, methods, and non-transitory computer-readable media for Derived Unique Key Attribute-Based Translations (DUKAT) including secure exchange of sensitive message elements between sequential message nodes using attribute-based key management. Each message node can access none, one, some, or all encrypted message elements based on assigned attributes of that message node. A key management node contains the attributes of the message nodes and provides key exchange for each Content Encryption Key (CEK) used to protect the message elements based on attributes of the message nodes.

FIG. 1A is a diagram illustrating an example method 100*a* for exchanging message elements via a key management node 120, according to various arrangments. The method 100*a* is a post-message key translation method in which a key management node 120 translates one or more first encrypted message elements (encrypted using a first DUK established between the key management node 120 with a sender node) to one or more second encrypted message elements (encrypted using a second DUK established between the key management node 120 with a recipient node) after the recipient node receives the message from the sender node.

Figure 1B:
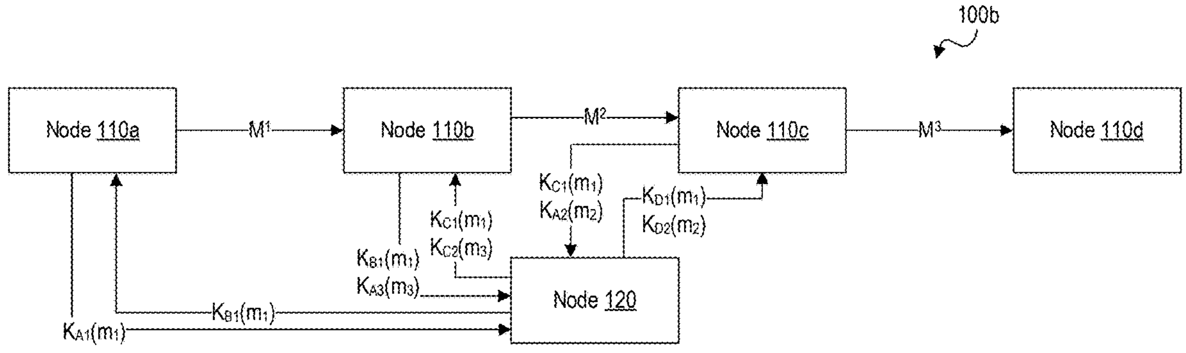
FIG. 1B is a diagram illustrating an example method for exchanging message elements via a key management node, according to various arrangments.

FIG. 1B is a diagram illustrating an example method 100*b* for exchanging message elements via a key management node 120, according to various arrangments. The method 100*b* is a pre-message key translation method in which a key management node 120 translates one or more first encrypted message elements (encrypted using a first DUK established between the key management node 120 with a sender node) to one or more second encrypted message elements (encrypted using a second DUK established between the key management node 120 with a recipient node) before the sender node sends the message to a recipient node after the recipient node receives the message from the sender node.

FIG. 2A is a table 200*a* illustrating example contents of the messages communicated among the message nodes 110*a*, 110*b*, 110*c*, and 110*d* and the key management node 120 as shown in FIG. 1A, according to various arrangements. FIG. 2B is a table 200*b* illustrating example contents of the messages communicated among the message nodes 110*a*, 110*b*, 110*c*, and 110*d* and the key management node 120 as shown in FIG. 1B, according to various arrangements. In FIG. 1A, the key management node 120 does not directly communicate with the node 110*a*. In FIG. 1B, the key management node 120 does not directly communicate with the node 110*d*.

The methods 100*a* and 100*b* can be performed by message nodes 110*a*, 110*b*, 110*c*, 110*d* and the key management node 120. Each message node 110*a*, 110*b*, 110*c*, or 110*d* can be a suitable computing system such as a desktop computer, laptop computer, smart phone, tablet, server, datacenter, cloud-based computing systems, and so on. In some examples, the key management node 120 can be or include a server capable of protecting keys using HSM. In some examples, the message node 110*a* is an original source and original encrypting entity of the message components of various messages. In some examples, each of the message nodes 110*b*, 110*c*, and 110*d* can be operated by an entity for which at least one message component of a message is intended. In some arrangements, each of the message nodes 110*a*, 110*b*, 110*c*, and 110*d* can be operated by an entity of a payment process or transaction process (e.g., a credit card transaction, a debit card transaction, a cryptocurrency transaction, and so on).

A message M can include a plurality of message elements (e.g., portions, chunks, partitions, and so on) denoted as $m_1$, $m_2$, $m_3$, e.g., $M=\{m_1, m_2, m_3\}$. In some arrangements, the message elements refers to a portion of the message that is in cleartext. Each message element can be encrypted to generate an encrypted message element. Examples of each message element can be or include a PIN, a PAN (e.g., a credit card number, a debit card number, and the like), PHI, PII, a financial account number, a password, social security number, a name, an address, an email address, a Merchant Category Code (MCC), Personally Identifiable Information (PII), Protected Health Information (PHI), or so on. In some examples, a message element can be or include a cryptographic key, a token, a certificate, or the like. In some examples, each message element can be a seed for key-generation (e.g., for generating a One-Time-Password (OTP)).

In some arrangements, the message node 110*a* can be a computing system operated by a merchant, the message node 110*b* can be a computing system operated by an acquirer, the message node 110*c* can be a computing system operated by a payment network or a privacy supplier, and the message node 110*d* can be a computing system operated by an issuer. The payment network can determine an interchange rate. For example, message element $m_1$ can be a PAN, message element $m_2$ can be a PIN, and message element $m_3$ can be an MCC, and so on. The message and the message elements refer to any information that needs protection during transmission and storage.

Each message element can be encrypted and decrypted using a respective CEK, such as a symmetric key (e.g., a DUK). For example, each message element m (e.g., $m_1$, $m_2$, or $m_3$) can be encrypted and decrypted using a DUK K, e.g., K(m), as shown in FIGS. 2A and 2B. Each message node 110*b*, 110*c*, or 110*d* can decrypt only an encrypted message element for which that message node has a corresponding DUK. Otherwise, the encrypted message element is ignored and forwarded as-encrypted to the next message node. Either the sender node or the recipient node, per authenticated and authorized permissions, interfaces with the central key management node 120 to perform an encryption translation from the sender's DUK to the receiver's DUK.

In some examples, the key management node 120 and each of the nodes 110*a*, 110*b*, 110*c*, and 110*d* and can establish a DUK via the Derived Unique Key Per Transaction (DUKPT) protocol, which is a symmetric key management scheme. An example of DUKPT is described in ANSI X9.24-3:2017 Retail Financial Services Symmetric Key Management—Part 3: Derived Unique Key Per Transaction. DUKPT is implemented using three components, entities, or nodes, such as a first node (e.g., a Point-Of-Sale (POS) terminal), a second node (e.g., an acquirer host system), and a Key Injection Facility (KIF). DUKPT is implemented on millions of POS terminals and is likewise used with thousands of Automated Teller Machines (ATM) worldwide. POS terminals are typically shipped from the manufacturer to the KIF, where keys are injected, then shipped to the merchant site for deployment. The acquirer host receives payment (debit or credit) authorization requests from POS terminals with a customer encrypted PIN.

In a conventional DUKPT deployment, terminals are located at the merchant site(s) and the host is operated either at each merchant location for large retail locations such as a grocery store, or at the merchant's central datacenter. In some DUKPT deployments, a Third Party Service Provider (TPSP) operates the host system for many smaller merchants at many locations, such as ATM located at brank branches, convenience stores, and outside parking lot locations. The KIF generates or the host provides a Base Derivation Key (BDK), such as Data Encryption Standard (DES) keys, 2K-3DES, 3K-DES keys, and Advanced Encryption Standard (AES)-supported keys.

A Terminal Identifier (TID) is unique to the first node (e.g., the POS) and is typically a logical character string installed into the first node by the KIF or the second node (e.g., the host)/ In some examples, the TID can be a device serial number from the manufacturer of the first node. The KIF encrypts the TID of the first node using the BDK to generate an Initialization Key (IK) that is likewise unique to the first node. The KIF injects the IK into the first node. In some examples, the KIF injects the cleartext IK over a managed physical cable or via a network using Transport Layer Security (TLS) over an encrypted tunnel or public key encryption.

For example, IK is used once, to generate the first of many encryption keys, e.g., Key 1, Key 2 . . . , Key N. The first node derives Key 1 from the IK and uses Key 1 to encrypt data (e.g., a PIN), and sends the encrypted data, the TID, and a counter (e.g., a transaction counter N) corresponding to the derived key (Key 1). Correspondingly, the second node (e.g., the host) encrypts the TID using the BDK to re-create the IK, then reiterates the derivation accounting to the counter (e.g., N=1) to derive the same key (Key 1) to decrypt the data.

The first node uses Key 1 to derive Key 2 and repeats the process. The second node re-creates the IK and reiterates the derivation according to the counter (e.g., N=2) to derive the same key (Key 2) to decrypt the data for the next transaction, and so on, until the counter is exhausted and the first node needs to be rekeyed. At any time the first node only contains keys that have not yet been used, such that any previously used key is erased. Thus, if the first node is compromised, the attacker cannot decrypt any previously encrypted data. Further, the second node only needs to manage one BDK to support thousands to millions of first nodes.

The first node maintains a counter N. Each time a session key (e.g., an encryption key) is derived, the counter is increased by 1 (e.g., N+1). The first node derives an encryption key using the IK and a counter. For example, the first node can run IK through a first function a number of times as indicated by the counter. In the examples in which the counter is N, the IK is run through the first function a first time to determine a Derived Key (DK), which is run through the first function a second time to determine an updated DK, until the DK from the iteration N−1 is run through the first function the Nth time to determine the final DK. The final DK is run through a second function to generate the encryption key, which is used by the first node to encrypt data (e.g., encrypt a message component). After the first node generates the encryption key, the first node erases the IK and the DKs.

The second node can derive the same encryption key using the BDK, the received TID, and the received counter. For example, the second node can generate the IK using the TID and the BDK. IK is then run through the first function a number of times as indicated by the counter. In the examples in which the counter is N, the IK is run through the first function a first time to determine a DK, which is run through the first function a second time to determine an updated DK, until the DK from the iteration N−1 is run through the first function the Nth time to determine the final DK. The final DK is run through a second function to generate the same encryption key, which is used by the second node to decrypt the encrypted data (e.g., the encrypted message component). After the second node generates the encryption key, the second node erases the IK and the DKs.

In some arrangements, the node 120 and each of nodes 110*a*, 110*b*, 110*c*, and 110*d* can derive a symmetric encryption key via DUKPT in the manner described herein. The node 120 can be one of the first node or the second node, and each of nodes 110*a*, 110*b*, 110*c*, and 110*d* can be the other one of the first node or the second node. For example, the node 120 can be a second node in DUKPT, and each of nodes 110*a*, 110*b*, 110*c*, and 110*d* can be a first node in DUKPT.

Each of the nodes 110*b*, 110*c*, and 110*d* may need to access one or more message elements of the message. In some examples, each node 110*b*, 110*c*, or 110*d* needs to access message element $m_1$ (e.g., PAN), thus the first encrypted message element for $m_1$ established using a first encryption key (e.g., a first DUK, derived by the node 120 and one of the nodes 110*a*, 110*b*, or 110*c*) is reestablished or translated to a second encrypted message element for $m_2$ using a second encryption key (e.g., a second DUK, derived by the node 120 and the recipient node 110*b*, 110*c*, or 110*d* that needs access to the message element $m_1$).

In the example in which only node 110*c* needs to access message element $m_3$ (e.g., MCC), thus the first encrypted message element for $m_3$ established using a first encryption key (e.g., a first DUK, derived by the node 120 and the node 110*a*) is reestablished or translated to a second encrypted message element for $m_2$ using a second encryption key (e.g., a second DUK, derived by the node 120 and the recipient node 110*c* that needs access to the message element $m_3$).

In some examples, only node 110*d* needs to access message element $m_2$ (e.g., PIN), thus the first encrypted message element for $m_2$ established using a first encryption key (e.g., a first DUK, derived by the node 120 and the node 110*a*) is reestablished or translated to a second encrypted message element for $m_2$ using a second encryption key (e.g., a second DUK, derived by the node 120 and the recipient node 110*d* that needs access to the message element $m_2$).

As shown in FIG. 1A and FIG. 2A, in the method 100*a* and the table 200*a*, the message node 110*a* generates the message M with its cleartext constituent message elements $m_1$, $m_2$, $m_3$, e.g., M={$m_1$, $m_2$, $m_3$}. The node 110*a* and the node 120 establish symmetrical keys (e.g., DUKs) $K_{A1}$, $K_{A2}$, and $K_{A3}$ for encrypting and decrypting the respective message elements $m_1$, $m_2$, $m_3$, for example, according to the DUKPT protocol. In some arrangements in which the node 110*a* is the first node (e.g., the POS) in the DUKPT protocol and the node 120 is the second node (e.g., the host) in the DUKPT protocol, the node 110*a* can derive the keys $K_{A1}$, $K_{A2}$, and $K_{A3}$ using the same TID of the node 110*a* and different counters. For example, the KIF can provide to the node 110*a* the IK derived using the TID of the node 110*a* and the BDK of the node 120, and the node 110*a* derives $K_{A1}$ using the IK and counter X, derives the $K_{A2}$ using the IK and counter X+1, and derives $K_{A3}$ using the IK and counter X+2. In some examples, the node 110*a* can derive the keys $K_{A1}$, $K_{A2}$, and $K_{A3}$ using three different TIDs of the node 110*a* and the same counter. In some examples, the node 110*a* can derive the keys $K_{A1}$, $K_{A2}$, and $K_{A3}$ using two or more different TIDs of the node 110*a* and two or more different counters. After deriving $K_{A1}$, $K_{A2}$, and $K_{A3}$, the node 110*a* encrypts each message element $m_1$, $m_2$, $m_3$ using a respective one of $K_{A1}$, $K_{A2}$, and $K_{A3}$ to generate message $M^1$={$K_{A1}(m_1)$, $K_{A2}(m_2)$, and $K_{A3}(m_3)$}. The node 110*a* sends the message $M^1$ to the next node 110*b*. In some examples, the node 110*a* sends the TID and the counter corresponding to each of $K_{A1}$, $K_{A2}$, and $K_{A3}$ to the node 110*b*, along with $M^1$.

The node 110*b*, which needs to determine the cleartext message element $m_1$, sends the encrypted message element $K_{A1}(m_1)$, the counter and the TID corresponding to $K_{A1}$, and the counter and the TID corresponding to $K_{B1}$ to the node 120 to convert or translate the encrypted message element $K_{A1}(m_1)$ to $K_{B1}(m_1)$, where $K_{B1}$ is a symmetrical key (e.g., DUK) established between the node 110*b* and the node 120. In other words, the node 110*b* and the node 120 can establish a symmetrical key (e.g., DUK) $K_{B1}$ for encrypting and decrypting the message element $m_1$, for example, according to the DUKPT protocol. In some arrangements in which the node 110*b* is the first node (e.g., the POS) in the DUKPT protocol and the node 120 is the second node (e.g., the host) in the DUKPT protocol, the node 110*b* can derive the key $K_{B1}$ using the TID of the node 110*b* and a counter. For example, the KIF can provide to the node 110*b* the IK derived using the TID of the node 110*b* and the BDK of the node 120, and the node 110*b* derives $K_{B1}$ using the IK and the counter.

In response to receiving the encrypted message element $K_{A1}(m_1)$, the counter and the TID corresponding to $K_{A1}$, and the counter and the TID corresponding to $K_{B1}$, the node 120 can derive, using its BDK and the received TID and counter corresponding to $K_{A1}$, the $K_{A1}$, and decrypts $K_{A1}(m_1)$ using $K_{A1}$ to obtain cleartext message element $m_1$. The node 120 can derive, using its BDK and the received TID and counter corresponding to $K_{B1}$, the $K_{B1}$, and encrypts $m_1$ using $K_{B1}$ to obtain encrypted message element $K_{B1}(m_1)$. The node 120 sends the encrypted message element $K_{B1}(m_1)$ back to the node 110*b*. In response to receiving $K_{B1}(m_1)$, the node 110*b* can decrypt $K_{B1}(m_1)$ using the $K_{B1}$ derived by the node 110*b*, to obtain $m_1$.

The node 110*b* sends the message $M^2$={$K_{B1}(m_1)$, $K_{A2}(m_2)$, and $K_{A3}(m_3)$} to the next node 110*c*. In $M^2$, the encrypted message element for $m_1$ is no longer $K_{A1}(m_1)$ but rather $K_{B1}(m_1)$. In some examples, the node 110*b* sends the TID and the counter corresponding to each of $K_{B1}$, $K_{A2}$, and $K_{A3}$ to the node 110*c*, along with $M^2$. The TID and the counter for each of $K_{A2}$ and $K_{A3}$ are used between the nodes 110*a* and 120 to establish $K_{A2}/K_{A3}$. The TID and the counter for $K_{B1}$ is used between the nodes 110*b* and 120 to establish $K_{B1}$.

The node 110*c*, which needs to determine the cleartext message element $m_1$ and $m_3$, sends to the node 120 the encrypted message element $K_{B1}(m_1)$, the counter and the TID corresponding to $K_{B1}$, the counter and the TID corresponding to $K_{C1}$, the encrypted message element $K_{A3}(m_3)$, the counter and the TID corresponding to $K_{A3}$, the counter and the TID corresponding to $K_{C2}$ to convert or translate the encrypted message element $K_{A1}(m_1)$ to $K_{B1}(m_1)$ and to convert or translate the encrypted message element $K_{A3}(m_3)$ to $K_{C2}(m_3)$. $K_{C1}$ is a symmetrical key (e.g., DUK) established between the node 110*c* and the node 120 for $m_1$, and $K_{C2}$ is a symmetrical key (e.g., DUK) established between the node 110*c* and the node 120 for $m_3$. In other words, the node 110*c* and the node 120 can establish a symmetrical key (e.g., DUK) $K_{C1}$ for encrypting and decrypting the message element $m_1$, for example, according to the DUKPT protocol, and the node 110*c* and the node 120 can establish another symmetrical key (e.g., DUK) $K_{C2}$ for encrypting and decrypting the message element $m_3$, for example, according to the DUKPT protocol.

In some arrangements in which the node 110*c* is the first node (e.g., the POS) in the DUKPT protocol and the node 120 is the second node (e.g., the host) in the DUKPT protocol, the node 110*c* can derive the key $K_{C1}$ using the TID of the node 110*c* and a counter. For example, the KIF can provide to the node 110*c* the IK derived using the TID of the node 110*c* and the BDK of the node 120, and the node 110*c* derives $K_{C1}$ using the IK and the counter.

In some arrangements in which the node 110*c* is the first node (e.g., the POS) in the DUKPT protocol and the node 120 is the second node (e.g., the host) in the DUKPT protocol, the node 110*c* can derive the key $K_{C2}$ using the TID of the node 110*c* and a counter. For example, the KIF can provide to the node 110*c* the IK derived using the TID of the node 110*c* and the BDK of the node 120, and the node 110*c* derives $K_{C2}$ using the IK and the counter. In some examples, the TID used to derive $K_{C1}$ and $K_{C2}$ are the same, and the counters used to derive $K_{C1}$ and $K_{C2}$ are different. In some examples, the TIDs used to derive $K_{C1}$ and $K_{C2}$ are different, and the counters used to derive $K_{C1}$ and $K_{C2}$ are the same. In some examples, the TIDs used to derive $K_{C1}$ and $K_{C2}$ are different, and the counters used to derive $K_{C1}$ and $K_{C2}$ are different.

In response to receiving the encrypted message element $K_{B1}(m_1)$, the counter and the TID corresponding to $K_{B1}$, and the counter and the TID corresponding to $K_{C1}$, the node 120 can derive, using its BDK and the received TID and counter corresponding to $K_{B1}$, the $K_{B1}$, and decrypts $K_{B1}(m_1)$ using $K_{B1}$ to obtain cleartext message element $m_1$. The node 120 can derive, using its BDK and the received TID and counter corresponding to $K_{C1}$, the $K_{C1}$, and encrypts $m_1$ using $K_{C1}$ to obtain encrypted message element $K_{C1}(m_1)$.

In response to receiving the encrypted message element $K_{A3}(m_3)$, the counter and the TID corresponding to $K_{A3}$, and the counter and the TID corresponding to $K_{C2}$, the node 120 can derive, using its BDK and the received TID and counter corresponding to $K_{A3}$, the $K_{A3}$, and decrypts $K_{A3}(m_3)$ using $K_{A3}$ to obtain cleartext message element $m_3$. The node 120 can derive, using its BDK and the received TID and counter corresponding to $K_{C2}$, the $K_{C2}$, and encrypts $m_3$ using $K_{C2}$ to obtain encrypted message element $K_{C2}(m_3)$.

The node 120 sends the encrypted message elements $K_{C1}(m_1)$ and $K_{C2}(m_3)$ back to the node 110*c*. In response to receiving $K_{C1}(m_1)$, the node 110*c* can decrypt $K_{C1}(m_1)$ using the $K_{C1}$ derived by the node 110*c*, to obtain $m_1$. In response to receiving $K_{C2}(m_3)$, the node 110*c* can decrypt $K_{C2}(m_3)$ using the $K_{C2}$ derived by the node 110*c*, to obtain $m_3$.

The node 110*c* sends the message $M^3=\{K_{C1}(m_1), K_{A2}(m_2), \text{and } K_{C2}(m_3)\}$ to the next node 110*d*. In $M^3$, the encrypted message element for $m_1$ is no longer $K_{B1}(m_1)$ but rather $K_{C1}(m_1)$, and the encrypted message element for $m_3$ is no longer $K_{A3}(m_3)$ but rather $K_{C2}(m_3)$. In some examples, the node 110*c* sends the TID and the counter corresponding to each of $K_{C1}$, $K_{A2}$, and $K_{C2}$ to the node 110*d*, along with $M^3$. The TID and the counter for each of $K_{A2}$ are used between the nodes 110*a* and 120 to establish $K_{A2}$. The TID and the counter for $K_{C1}$ is used between the nodes 110*c* and 120 to establish $K_{C1}$. The TID and the counter for $K_{C2}$ is used between the nodes 110*c* and 120 to establish $K_{C2}$.

The node 110*d*, which needs to determine the cleartext message element $m_1$ and $m_2$, sends to the node 120 the encrypted message element $K_{C1}(m_1)$, the counter and the TID corresponding to $K_{C1}$, the counter and the TID corresponding to $K_{D1}$, the encrypted message element $K_{A2}(m_2)$, the counter and the TID corresponding to $K_{A2}$, the counter and the TID corresponding to $K_{D2}$ to convert or translate the encrypted message element $K_{C1}(m_1)$ to $K_{D1}(m_1)$ and to convert or translate the encrypted message element $K_{A2}(m_2)$ to $K_{D2}(m_2)$. $K_{D1}$ is a symmetrical key (e.g., DUK) established between the node 110*d* and the node 120 for $m_1$, and $K_{D2}$ is a symmetrical key (e.g., DUK) established between the node 110*d* and the node 120 for $m_2$. In other words, the node 110*d* and the node 120 can establish a symmetrical key (e.g., DUK) $K_{D1}$ for encrypting and decrypting the message element $m_1$, for example, according to the DUKPT protocol, and the node 110*d* and the node 120 can establish another symmetrical key (e.g., DUK) $K_{D2}$ for encrypting and decrypting the message element $m_3$, for example, according to the DUKPT protocol.

In some arrangements in which the node 110*d* is the first node (e.g., the POS) in the DUKPT protocol and the node 120 is the second node (e.g., the host) in the DUKPT protocol, the node 110*d* can derive the key $K_{D1}$ using the TID of the node 110*d* and a counter. For example, the KIF can provide to the node 110*d* the IK derived using the TID of the node 110*d* and the BDK of the node 120, and the node 110*d* derives $K_{D1}$ using the IK and the counter.

In some arrangements in which the node 110*d* is the first node (e.g., the POS) in the DUKPT protocol and the node 120 is the second node (e.g., the host) in the DUKPT protocol, the node 110*d* can derive the key $K_{D2}$ using the TID of the node 110*d* and a counter. For example, the KIF can provide to the node 110*d* the IK derived using the TID of the node 110*d* and the BDK of the node 120, and the node 110*d* derives $K_{D2}$ using the IK and the counter. In some examples, the TID used to derive $K_{D1}$ and $K_{D2}$ are the same, and the counters used to derive $K_{D1}$ and $K_{D2}$ are different. In some examples, the TIDs used to derive $K_{D1}$ and $K_{D2}$ are different, and the counters used to derive $K_{D1}$ and $K_{D2}$ are the same. In some examples, the TIDs used to derive $K_{D1}$ and $K_{D2}$ are different, and the counters used to derive $K_{D1}$ and $K_{D2}$ are different.

In response to receiving the encrypted message element $K_{C1}(m_1)$, the counter and the TID corresponding to $K_{C1}$, and the counter and the TID corresponding to $K_{D1}$, the node 120 can derive, using its BDK and the received TID and counter corresponding to $K_{C1}$, the $K_{C1}$, and decrypts $K_{C1}(m_1)$ using $K_{C1}$ to obtain cleartext message element $m_1$. The node 120 can derive, using its BDK and the received TID and counter corresponding to $K_{D1}$, the $K_{D1}$, and encrypts $m_1$ using $K_{D1}$ to obtain encrypted message element $K_{D1}(m_1)$.

In response to receiving the encrypted message element $K_{A2}(m_2)$, the counter and the TID corresponding to $K_{A2}$, and the counter and the TID corresponding to $K_{D2}$, the node 120 can derive, using its BDK and the received TID and counter corresponding to $K_{A2}$, the $K_{A2}$, and decrypts $K_{A2}(m_2)$ using $K_{A2}$ to obtain cleartext message element $m_2$. The node 120 can derive, using its BDK and the received TID and counter corresponding to $K_{D2}$, the $K_{D2}$, and encrypts $m_2$ using $K_{D2}$ to obtain encrypted message element $K_{D2}(m_3)$.

The node 120 sends the encrypted message elements $K_{D1}(m_1)$ and $K_{D2}(m_2)$ back to the node 110*d*. In response to receiving $K_{D1}(m_1)$, the node 110*d* can decrypt $K_{D1}(m_1)$ using the $K_{D1}$ derived by the node 110*d*, to obtain $m_1$. In response to receiving $K_{D2}(m_2)$, the node 110*d* can decrypt $K_{D2}(m_2)$ using the $K_{D2}$ derived by the node 110*d*, to obtain $m_2$.

In FIG. 2A and FIG. 2B and in the method 100*b* and the table 200*a*, the sender node has knowledge of and can identify the recipient node. Therefore, the sender node can request the message element translation at the node 120 and sends the translated encrypted message element to the recipient node. In some arrangements, the message node 110*a* generates the message M with its cleartext constituent message elements $m_1$, $m_2$, $m_3$, e.g., $M=\{m_1, m_2, m_3\}$. The node 110*a* and the node 120 establish symmetrical keys (e.g., DUKs) $K_{A1}$, $K_{A2}$, and $K_{A3}$ for encrypting and decrypting the respective message elements $m_1$, $m_2$, $m_3$, for example, according to the DUKPT protocol. In some arrangements in which the node 110*a* is the first node (e.g., the POS) in the DUKPT protocol and the node 120 is the second node (e.g., the host) in the DUKPT protocol, the node 110*a* can derive the keys $K_{A1}$, $K_{A2}$, and $K_{A3}$ using the same TID of the node 110*a* and different counters. For example, the KIF can provide to the node 110*a* the IK derived using the TID of the node 110*a* and the BDK of the node 120, and the node 110*a* derives $K_{A1}$ using the IK and counter X, derives the $K_{A2}$ using the IK and counter X+1, and derives $K_{A3}$ using the IK and counter X+2. In some examples, the node 110*a* can derive the keys $K_{A1}$, $K_{A2}$, and $K_{A3}$ using three different TIDs of the node 110*a* and the same counter. In some examples, the node 110*a* can derive the keys $K_{A1}$, $K_{A2}$, and $K_{A3}$ using two or more different TIDs of the node 110*a* and two or more different counters. After deriving $K_{A1}$, $K_{A2}$, and $K_{A3}$, the node 110*a* encrypts each message element $m_1$, $m_2$, $m_3$ using a respective one of $K_{A1}$, $K_{A2}$, and $K_{A3}$ to generate encrypted message components $K_{A1}(m_1)$, $K_{A2}(m_2)$, and $K_{A3}(m_3)$.

The sender node 110*a* can identify that the intended recipient is node 110*b*, which needs to determine the cleartext message element $m_1$. Thus, before sending the message, the sender node 110*a* requests that the node 120 to translate $K_{A1}(m_1)$ to $K_{B1}(m_1)$ for the recipient node 120*b*. For example, the sender node 110*a* sends the encrypted message element $K_{A1}(m_1)$, the counter and the TID corresponding to $K_{A1}$ to convert or translate the encrypted message element $K_{A1}(m_1)$ to $K_{B1}(m_1)$. $K_{B1}$ is a symmetrical key (e.g., DUK) established between the node 110*b* and the node 120. In some examples, the node 120 can receive the counter and the TID corresponding to $K_{B1}$ from the node 110*b* upon requesting the same from the node 110*b*. In other words, the node 110*b* and the node 120 can establish a symmetrical key (e.g., DUK) $K_{B1}$ for encrypting and decrypting the message element $m_1$, for example, according to the DUKPT protocol. In some arrangements in which the node 110*b* is the first node (e.g., the POS) in the DUKPT protocol and the node 120 is the second node (e.g., the host) in the DUKPT protocol, the node 110*b* can derive the key $K_{B1}$ using the TID of the node 110*b* and a counter. For example, the KIF can provide to the node 110*b* the IK derived using the TID of the node 110*b* and the BDK of the node 120, and the node 110*b* derives $K_{B1}$ using the IK and the counter.

In response to receiving the encrypted message element $K_{A1}(m_1)$, the counter and the TID corresponding to $K_{A1}$, and in response to obtaining the counter and the TID corresponding to $K_{B1}$, the node 120 can derive, using its BDK and the received TID and counter corresponding to $K_{A1}$, the $K_{A1}$, and decrypts $K_{A1}(m_1)$ using $K_{A1}$ to obtain cleartext message element $m_1$. The node 120 can derive, using its BDK and the received TID and counter corresponding to $K_{B1}$, the $K_{B1}$, and encrypts $m_1$ using $K_{B1}$ to obtain encrypted message element $K_{B1}(m_1)$. The node 120 sends the encrypted message element $K_{B1}(m_1)$ back to the node 110*a*. The node 110*a* sends the message $M^1=\{K_{B1}(m_1), K_{A2}(m_2), \text{and } K_{A3}(m_3)\}$ to the next node 110*b*. In $M^1$, the encrypted message element for $m_1$ is no longer $K_{A1}(m_1)$ but rather $K_{B1}(m_1)$. In some examples, the node 110*a* sends the TID and the counter corresponding to each of $K_{B1}$, $K_{A2}$ and $K_{A3}$ to the node 110*b*, along with $M^1$. The node 110*b*, which needs to determine the cleartext message element $m_1$, decrypt $K_{B1}(m_1)$ using the $K_{B1}$ derived by the node 110*b*, to obtain $m_1$.

The sender node 110*b* can identify that the intended recipient is node 110*c*, which needs to determine the cleartext message element $m_1$ and $m_3$. Thus, before sending the message, the sender node 110*b* requests that the node 120 to translate $K_{B1}(m_1)$ to $K_{C1}(m_1)$ and translate $K_{A3}(m_3)$ to $K_{C2}(m_3)$ for the recipient node 120*c*. For example, the sender node 110*b* sends the encrypted message elements $K_{B1}(m_1)$ and $K_{A3}(m_3)$, the counter and the TID corresponding to $K_{B1}$ to convert or translate the encrypted message element $K_{B1}(m_1)$ to $K_{C1}(m_1)$, and the counter and the TID corresponding to $K_{A3}$ to convert or translate the encrypted message element $K_{A3}(m_3)$ to $K_{C2}(m_3)$. $K_{C1}$ and $K_{C2}$ are symmetrical keys (e.g., DUKs) established between the node 110*c* and the node 120.

In some examples, the node 120 can receive the counter and the TID corresponding to $K_{C1}$ and the counter and the TID corresponding to $K_{C2}$ from the node 110*c* upon requesting the same from the node 110*c*. In other words, the node 110*c* and the node 120 can establish a symmetrical key (e.g., DUK) $K_{C1}$ for encrypting and decrypting the message element $m_1$, for example, according to the DUKPT protocol and establish a symmetrical key (e.g., DUK) $K_{C2}$ for encrypting and decrypting the message element $m_3$, for example, according to the DUKPT protocol.

In some arrangements in which the node 110*c* is the first node (e.g., the POS) in the DUKPT protocol and the node 120 is the second node (e.g., the host) in the DUKPT protocol, the node 110*c* can derive the key $K_{C1}$ using the TID of the node 110*c* and a counter. For example, the KIF can provide to the node 110*c* the IK derived using the TID of the node 110*c* and the BDK of the node 120, and the node 110*c* derives $K_{C1}$ using the IK and the counter.

In some arrangements in which the node 110*c* is the first node (e.g., the POS) in the DUKPT protocol and the node 120 is the second node (e.g., the host) in the DUKPT protocol, the node 110*c* can derive the key $K_{C2}$ using the TID of the node 110*c* and a counter. For example, the KIF can provide to the node 110*c* the IK derived using the TID of the node 110*c* and the BDK of the node 120, and the node 110*c* derives $K_{C2}$ using the IK and the counter. In some examples, the TID used to derive $K_{C1}$ and $K_{C2}$ are the same, and the counters used to derive $K_{C1}$ and $K_{C2}$ are different. In some examples, the TIDs used to derive $K_{C1}$ and $K_{C2}$ are different, and the counters used to derive $K_{C1}$ and $K_{C2}$ are the same. In some examples, the TIDs used to derive $K_{C1}$ and $K_{C2}$ are different, and the counters used to derive $K_{C1}$ and $K_{C2}$ are different.

In response to receiving the encrypted message element $K_{B1}(m_1)$, the counter and the TID corresponding to $K_{B1}$, and the counter and the TID corresponding to $K_{C1}$, the node 120 can derive, using its BDK and the received TID and counter corresponding to $K_{B1}$, the $K_{B1}$, and decrypts $K_{B1}(m_1)$ using $K_{B1}$ to obtain cleartext message element $m_1$. The node 120 can derive, using its BDK and the received TID and counter corresponding to $K_{C1}$, the $K_{C1}$, and encrypts $m_1$ using $K_{C1}$ to obtain encrypted message element $K_{C1}(m_1)$.

In response to receiving the encrypted message element $K_{A3}(m_3)$, the counter and the TID corresponding to $K_{A3}$, and the counter and the TID corresponding to $K_{C2}$, the node 120 can derive, using its BDK and the received TID and counter corresponding to $K_{A3}$, the $K_{A3}$, and decrypts $K_{A3}(m_3)$ using $K_{A3}$ to obtain cleartext message element $m_3$. The node 120 can derive, using its BDK and the received TID and counter corresponding to $K_{C2}$, the $K_{C2}$, and encrypts $m_3$ using $K_{C2}$ to obtain encrypted message element $K_{C2}(m_3)$.

The node 120 sends the encrypted message elements $K_{C1}(m_1)$ and $K_{C2}(m_3)$ back to the node 110*b*. The node 110*b* sends the message $M^2=\{K_{C1}(m_1), K_{A2}(m_2), \text{and } K_{C2}(m_3)\}$ to the next node 110*c*. In $M^2$, the encrypted message element for $m_1$ is no longer $K_{B1}(m_1)$ but rather $K_{C1}(m_1)$, and the encrypted message element for $m_3$ is no longer $K_{A3}(m_3)$ but rather $K_{C2}(m_3)$. In some examples, the node 110*b* sends the TID and the counter corresponding to each of $K_{C1}$, $K_{A2}$ and $K_{C2}$ to the node 110*c*, along with $M^2$. The node 110*c*, which needs to determine the cleartext message elements $m_1$ and $m_3$, decrypts $K_{C1}(m_1)$ using the $K_{C1}$ derived by the node 110*c*, to obtain $m_1$ and decrypts $K_{C2}(m_3)$ using the $K_{C2}$ derived by the node 110*c*, to obtain $m_3$.

The sender node 110*c* can identify that the intended recipient is node 110*d*, which needs to determine the cleartext message element $m_1$ and $m_2$. Thus, before sending the message, the sender node 110*c* requests that the node 120 to translate $K_{C1}(m_1)$ to $K_{D1}(m_1)$ and translate $K_{A2}(m_2)$ to $K_{D2}(m_2)$ for the recipient node 120*d*. For example, the sender node 110*c* sends the encrypted message elements $K_{C1}(m_1)$ and $K_{A2}(m_2)$, the counter and the TID corresponding to $K_{C1}$ to convert or translate the encrypted message element $K_{C1}(m_1)$ to $K_{D1}(m_1)$, and the counter and the TID corresponding to $K_{A2}$ to convert or translate the encrypted message element $K_{A2}(m_2)$ to $K_{D2}(m_2)$. $K_{D1}$ and $K_{D2}$ are symmetrical keys (e.g., DUKs) established between the node 110*d* and the node 120.

In some examples, the node 120 can receive the counter and the TID corresponding to $K_{D1}$ and the counter and the TID corresponding to $K_{D2}$ from the node 110*d* upon requesting the same from the node 110*d*. In other words, the node 110*d* and the node 120 can establish a symmetrical key (e.g., DUK) $K_{D1}$ for encrypting and decrypting the message element $m_1$, for example, according to the DUKPT protocol and establish a symmetrical key (e.g., DUK) $K_{D2}$ for encrypting and decrypting the message element $m_2$, for example, according to the DUKPT protocol.

In some arrangements in which the node 110*d* is the first node (e.g., the POS) in the DUKPT protocol and the node 120 is the second node (e.g., the host) in the DUKPT protocol, the node 110*d* can derive the key $K_{D1}$ using the TID of the node 110*d* and a counter. For example, the KIF can provide to the node 110*d* the IK derived using the TID of the node 110*d* and the BDK of the node 120, and the node 110*d* derives $K_{D1}$ using the IK and the counter.

In some arrangements in which the node 110*d* is the first node (e.g., the POS) in the DUKPT protocol and the node 120 is the second node (e.g., the host) in the DUKPT protocol, the node 110*d* can derive the key $K_{D2}$ using the TID of the node 110*d* and a counter. For example, the KIF can provide to the node 110*d* the IK derived using the TID of the node 110*d* and the BDK of the node 120, and the node 110*d* derives $K_{D2}$ using the IK and the counter. In some examples, the TID used to derive $K_{D1}$ and $K_{D2}$ are the same, and the counters used to derive $K_{D1}$ and $K_{D2}$ are different. In some examples, the TIDs used to derive $K_{D1}$ and $K_{D2}$ are different, and the counters used to derive $K_{D1}$ and $K_{D2}$ are the same. In some examples, the TIDs used to derive $K_{D1}$ and $K_{D2}$ are different, and the counters used to derive $K_{D1}$ and $K_{D2}$ are different.

In response to receiving the encrypted message element $K_{C1}(m_1)$, the counter and the TID corresponding to $K_{C1}$, and the counter and the TID corresponding to $K_{D1}$, the node 120 can derive, using its BDK and the received TID and counter corresponding to $K_{C1}$, the $K_{B1}$, and decrypts $K_{C1}(m_1)$ using $K_{C1}$ to obtain cleartext message element $m_1$. The node 120 can derive, using its BDK and the received TID and counter corresponding to $K_{D1}$, the $K_{D1}$, and encrypts $m_1$ using $K_{D1}$ to obtain encrypted message element $K_{D1}(m_1)$.

In response to receiving the encrypted message element $K_{A2}(m_2)$, the counter and the TID corresponding to $K_{A2}$, and the counter and the TID corresponding to $K_{D2}$, the node 120 can derive, using its BDK and the received TID and counter corresponding to $K_{A2}$, the $K_{A2}$, and decrypts $K_{A2}(m_2)$ using $K_{A2}$ to obtain cleartext message element $m_2$. The node 120 can derive, using its BDK and the received TID and counter corresponding to $K_{D2}$, the $K_{D2}$, and encrypts $m_2$ using $K_{D2}$ to obtain encrypted message element $K_{D2}(m_2)$.

The node 120 sends the encrypted message elements $K_{D1}(m_1)$ and $K_{D2}(m_2)$ back to the node 110*c*. The node 110*c* sends the message $M^3=\{K_{D1}(m_1), K_{D2}(m_2)$, and $K_{C2}(m_3)\}$ to the next node 110*d*. In $M^3$, the encrypted message element for $m_1$ is no longer $K_{C1}(m_1)$ but rather $K_{D1}(m_1)$, and the encrypted message element for $m_2$ is no longer $K_{A2}(m_2)$ but rather $K_{D2}(m_2)$. In some examples, the node 110*c* sends the TID and the counter corresponding to each of $K_{D1}$ and $K_{D2}$ to the node 110*d*, along with $M^3$. The node 110*d*, which needs to determine the cleartext message elements $m_1$ and $m_2$, decrypts $K_{D1}(m_1)$ using the $K_{D1}$ derived by the node 110*d*, to obtain $m_1$ and decrypts $K_{D2}(m_2)$ using the $K_{D2}$ derived by the node 110*d*, to obtain $m_2$.

The messages $M^1$, $M^2$, $M^3$ in the methods 100*a* and 100*b* differ given that the receiver node is performing the translation in the method 100*a* and the sender node is performing the translation in the method 100*b*. This is because DUKAT can be performed for either the sender node or the receiver node is the requesting node that is requesting the translation by the node 120. In both the methods 100*a* and 100*b*, in the examples in which the inbound message element is encrypted using the receiver's DUK, then no translation is needed. In the examples in which the outbound message element is not intended for the next receiver, then no translation is needed. In some examples, DUKAT is quantum resistant as it uses symmetric algorithms (e.g., AES256), and DUKAT is quantum ready such that no algorithms in DUKAT needs to be transitioned to Post-Quantum Cryptography (PQC) algorithms. Each DUK is self-identified using the node identifier (e.g., TID) and the DUKPT counter.

Although the DUKPT is used as an example hereto as a mechanism for the key management node 120 and each of the nodes 110*a*, 110*b*, 110*c*, and 110*d* to establish a symmetric key, the symmetric key can also be established using other protocols, such as Unique Key Per Transaction (UKPT) or distributed Quantum Key Distribution (dQKD). UKPT is presented in the draft standard X9.24-4-202X Symmetric Key Management—Part 4: Host-to-Host Key Management using UKPT, and is considered a variation on DUKPT. In UKPT, two hosts (e.g., a first host is the key management node 120 and the second host is the node 110*a*, 110*b*, 110*c*, or 110*d*) exchange a Host Derivation Key (HDK). Unlike in DUKPT, KIF processes, and IK are not used in UKPT. Rather, the BDK is replaced by the HDK which is fed into a KDF a number of times corresponding to the counter.

The DUKAT mechanism further includes attribute-based access control can allow or deny access to information or data by allowing or denying the translation of encrypted message elements based on one or more of at least one attribute of the sender node, at least one attribute of the recipient node, or at least one attribute of the message component or encrypted message component for translation is needed. Each sender node, recipient node, or the message component/encrypted message component can have one or more attributes, and each attribute can change or remain static from time to time. A policy engine of the key management node 120 can allow or deny key translation according to such attributes. DUKAT is a type of attribute-based access control that allows a party to decrypt one of multiple message components of a message.

For example, the message node 110*a* has an attribute (e.g., a group name) of "merchant," the message node 110*b* has an attribute of "acquirer," the message node 110*c* has an attribute of "payment network" or "privacy supplier," and the message node 110*d* has an attribute of "issuer." The message node 110*c* can route traffic to another node in response to determining privacy information based on which node 110*c* can route the traffic to another node. For example, the message elements $m_1$ has the attribute (e.g., type) of a "PAN," $m_2$ has the attribute of a "PIN," and $m_3$ has the attribute of an "MCC." The key management node 120 manages the attributes of the nodes 110*a*, 110*b*, 110*c*, and 110*d* and the message elements and selectively allows translations between a first DUK established between the node 120 and one of the nodes 110*a*, 110*b*, 110*c*, and 110*d* and a second DUK established between the node 120 and another one of the nodes 110*a*, 110*b*, 110*c*, and 110*d*.

In some examples, the key management node 120 maintains a mapping table indicating of a mapping among the TIDs, names, and attributes of the sender message nodes, TIDs, names, and attributes of the recipient message nodes, and attributes of various message elements. In response to receiving a translation request from a message node (e.g., the sender node in the method 100*b* and the receiver node in the method 100*a*) which includes an TID or name of the sender node, an TID or name of the receiver node, and the attributes of each message component or encrypted message component of M, the key management node 120 can query or look up those attributes within the mapping to table to determine whether translation for a message element is allowed. The translation in the manner described can be performed in response to determining that the translation is allowed according to the table. In some examples, the mapping table includes at least one of table of "allowed" translation attributes and a table of a "denied" translation attributes.

In addition to key translation with provides for data confidentiality, digital signatures can be provided to provide for data integrity. For example, the key management node 120 can use a private key $Y^P$ to generate a cryptographic signature over each translated message element. The signed translated message elements are provided to the sender node or the recipient node in the manner described. The sender node or the recipient node verifies the cryptographic signature on a signed translated message using another public key $Y_P$ of the key management node 120 in response to receiving the signed translated message element. The private key $Y^P$ and the public key $Y_P$ of the key management node 120 form a public/private key pair and are mathematically related to one another.

For example, the key management node 120 can use a private key $Z^P$ (different from the private key $Y^P$) of the key management node 120 and a public key of each sender or recipient node to signcrypt (e.g., encryption and sign in one logical step) each translated message element. The signcrypted translated message elements are provided to the sender or recipient nodes in the manner described. The sender or recipient node verifies the signature and decrypts the signcrypted translated message using a public key $Z_P$ of the key management node 120 and a private key of the sender or recipient node in response to receiving the signcrypted translated message element. The private key $Z^P$ and the public key $Z_P$ of the key management node 120 form a public/private key pair and are mathematically related to one another. The private key and the public key of the sender or recipient node used in signcryption and verifying the signature and decrypting the signcrypted translated message form a public/private key pair and are mathematically related to one another.

In some examples, the key management node 120 includes or is operatively coupled to a Time Stamp Authority (TSA) to provide a Time Stamp Token (TST) for the translated message components thereof. The TST can be provided to a relying party (e.g., the sender node or the recipient node). In some arrangements in which the TSA is external to the key management node 120 and is coupled to the key management node 120 via a network, a requestor (e.g., the key management node 120) sends hashed content of the translated message or one or more message components thereof to the TSA and receives the TST from the TSA. The key management node 120 can send the original data (e.g., the translated message component) and the TST to the sender node or the recipient node. The TSA can generate the TST by running the hashed content through a TST function. The TSA does not have access to the original content. The TST function can create a TST by appending a timestamp from a calibrated clock to the respective hashed content and generating a cryptographic signature, such as a digital signature, a Message Authentication Code (MAC), an Hash-based Message Authentication Code (HMAC), or a hash chain over the timestamp appended to the content. The digital signature is signed using a private key $V^P$ of the key management node 120. The cryptographic signature can be verified by the sender or recipient node using a public key $V_P$ of the key management node 120 to determine integrity provable to a trusted time indicated by the TST. The private key $V^P$ and the public key $V_P$ of the key management node 120 form a public/private key pair and are mathematically related to one another.

In some arrangements in which the TSA is or is part of the key management node 120, the key management node 120 can generate the TST by running the hashed content of the translated message or one or more message components thereof through a TST function. The TST function can create a TST by appending a timestamp from a calibrated clock to the respective hashed content and generating a cryptographic signature over the timestamp appended to the content. The digital signature is signed using a private key $V^P$ of the key management node 120. The key management node 120 can send the original data (e.g., the translated message or one or more message components thereof) and the TST to the sender or recipient node. The cryptographic signature can be verified by the sender or recipient node using another public key $V_P$ of the key management node 120 to determine integrity provable to a trusted time indicated by the TST. The private key $V^P$ and the public key $V_P$ of the key management node 120 form a public/private key pair and are mathematically related to one another.

In some examples, the TST can be generated using one or more TST mechanisms including 1) Digital Signature Method, 2) MAC Method, 3) Linked Token Method, 4) Linked and Signed Method, and 5) Transient Key Method. Linked Token Method uses a MAC for the TST cryptographic signature while the Linked and Signed Method uses a digital signature for the TST cryptographic signature. Both methods create a chain of TST linked together using a hash algorithm. The Transient Key Method uses Elliptic Curve Digital Signature Algorithm (ECDSA) to sign each TST and changes the signature key on a regular interval and manages the ECDSA signature keys using an internal key chain. The TST is detached from the content itself.

ANSI X9.95 defines requirements and methodologies for a TSA to issue a TST. Unlike legacy timestamps which rely on synchronized clocks, TSA use calibrated clocks aligned with a National Measurement Institutes (NMI) and the International Time Authority (ITA). The Bureau International des Poids et Mesures (BIPM) near Paris, France is the official ITA that calibrates the clocks of each NMI. The two NMI in the USA is the NIST Time and Frequency Division that manages the F1 Cesium Fountain Atomic Clock and the United States Naval Observatory (USNO) which manages the Global Positioning System (GPS).

Figure 3:
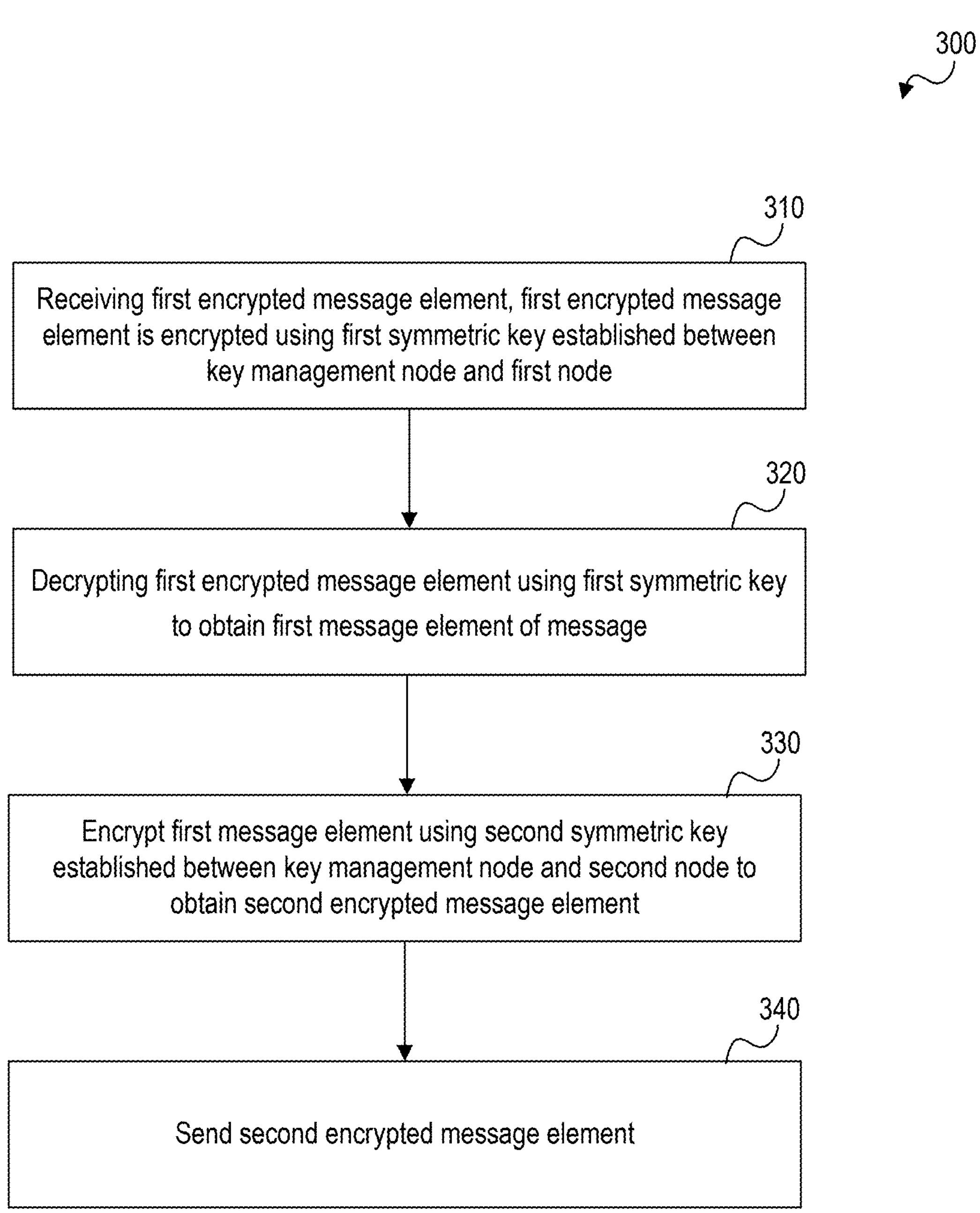
FIG. 3 is a diagram illustrating an example method for exchanging message elements via a key management node, according to various arrangments.

FIG. 3 is a process flow diagram illustrating an example method 300 for exchanging message elements via a key management node 120, according to various arrangments. The methods 100*a* and 100*b* are example implementations of the method 300.

At 310, the key management node 120 receives a first encrypted message element. The first encrypted message element is encrypted using a first symmetric key established between the key management node and a first node. At 320, the key management node 120 decrypts the first encrypted message element using the first symmetric key to obtain a first message element of a message, At 330, the key management node 120 encrypts the first message element using a second symmetric key established between the key management node and a second node to obtain a second encrypted message element. At 340, the key management node 120 sends the second encrypted message element.

In some examples, the first symmetric key includes a DUK derived by the key management node and the first node using a DUKPT protocol, and the second symmetric key comprises a DUK derived by the key management node and the second node using the DUKPT protocol.

In some examples, the method 300 further includes determining, by the key management node 120, the first symmetric key using an identifier (e.g., TID) of the first node and a first counter and determining, by the key management node 120, the second symmetric key using an identifier (e.g., TID) of the second node and a second counter.

In some arrangements as described in FIGS. 1A and 2A, the key management node 120 receives the first encrypted message element (e.g., $K_{B1}(m_1)$) from the second node (e.g., the recipient node such as node 110_c_). The key management node 120 sends the second encrypted message element to the second node. The second node decrypts the second encrypted message element to obtain the first message element. In some examples, the second node receives a first encrypted message (e.g., $M^2$) from the first node (e.g., the node 110_b_), the first encrypted message including the first encrypted message element. In some examples, the second node sends a second encrypted message ($M^3$) to a third node (e.g., the node 110_d_), the second encrypted message includes the second encrypted message element (e.g., $K_{C1}(m_1)$).

In some examples, the method 300 further includes receiving, by the key management node 120 from the second node, a third encrypted message element (e.g., $K_{A3}(m_3)$) (the third encrypted message element is encrypted using a third symmetric key established between the key management node 120 and a third node (e.g., the node 110_a_)), decrypting, by the key management node 120, the third encrypted message element using the third symmetric key to obtain a second message element (e.g., $m_3$) of the message, encrypting, by the key management node 120, the second message element using a fourth symmetric key (e.g., $K_{C2}$) established between the key management node 120 and the second node to obtain a fourth encrypted message element (e.g., $K_{C2}$ ($m_3$)), and sending, by the key management node 120 to the second node, the fourth encrypted message element. The second node decrypts the fourth encrypted message element to obtain the second message element.

In some examples, the second node receives a first encrypted message (e.g., $M^2$) from the first node (e.g., the node 110_b_), the first encrypted message including the first encrypted message element and the third encrypted message element. In some examples, the second node sends a second encrypted message to a third node (e.g., the node 110_d_), the second encrypted message including the second encrypted message element (e.g., $K_{C1}(m_1)$) and the fourth encrypted message element (e.g., $K_{C2}(m_3)$).

In some arrangements as described in FIGS. 1B and 2B, the key management node 120 receives the first encrypted message element (e.g., $K_{B1}(m_1)$) from the first node (e.g., the sender node 110_b_). The key management node 120 sends the second encrypted message element (e.g., $K_{C1}(m_1)$) to the first node. The second node (e.g., the node 110_c_) decrypts the second encrypted message element to obtain the first message element. In some examples, the first node receives a first encrypted message (e.g., $M_1$) from a third node (e.g., the node 110_a_), the first encrypted message including the first encrypted message element. In some examples, the first node sends a second encrypted message (e.g., $M_2$) to the second node, the second encrypted message including the second encrypted message element.

In some arrangements, the method 300 further includes receiving, by the key management node 120 from the first node, a third encrypted message element (e.g., $K_{A3}(m_3)$) (the third encrypted message element is encrypted using a third symmetric key established between the key management node 120 and a third node (e.g., the node 110_a_), decrypting, by the key management node 120, the third encrypted message element using the third symmetric key to obtain a second message element of the message, encrypting, by the key management node 120, the second message element using a fourth symmetric key (e.g., $K_{C2}$) established between the key management node 120 and the second node to obtain a fourth encrypted message element (e.g., $K_{C2}$ ($m_3$)), and sending, by the key management node 120 to the first node, the fourth encrypted message element. The second node decrypts the fourth encrypted message element to obtain the second message element.

In some examples, the second node receives a first encrypted message (e.g., $M_2$) from the first node (e.g., the node 110_b_), the first encrypted message including the second encrypted message element and the fourth encrypted message element. In some examples, the first node receives a second encrypted message from a third node (e.g., the node 110_a_), the second encrypted message including the first encrypted message element (e.g., $K_{B1}(m_1)$) and the third encrypted message element (e.g., $K_{A3}(m_3)$).

The communications (e.g., transmission and reception of data) among the message nodes and the key management node can be performed over a suitable communication link shown as arrows in FIGS. 1A and 1B. Each of the communication link can be a wireless communication link such as any suitable Local Area Network (LAN), Wide Area Network (WAN), satellite communication network, or a combination thereof. For example, each communication link can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, non-radio frequency communication networks (such as infrared networks, ultraviolet networks, laser networks), a combination thereof, and/or the like. Each communication link is structured to permit the exchange of data, values, parameters, signals, instructions, messages, and the like.

FIG. 4 illustrates block diagrams of an example key management node 120 and an example message node 110, according to some arrangements. The message node 110 is an example of each of the message nodes 110_a_, 110_b_, 110_c_, and 110_d_.

The key management node 120 can be a suitable computing system such as a desktop computer, laptop computer, smart phone, tablet, server, on-premise computing system, datacenter, cloud computing system, and so on. The key management node 120 is shown to include various circuits and logic for implementing the operations described herein. More particularly, the key management node 120 includes one or more of a processing circuit 401, a network interface circuit 404, a cryptography circuit 405, an attribute mapping table 406, and a TSA 407. While various circuits, interfaces, and logic with particular functionality are shown, it should be understood that the key management node 120 includes any number of circuits, interfaces, and logic for facilitating the operations described herein. For example, the activities of multiple circuits are combined as a single circuit and implemented on a same processing circuit (e.g., the processing circuit 401), as additional circuits with additional functionality are included.

In some arrangements, the processing circuit 401 includes a processor 402 and a memory 403. The processor 402 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 403 (e.g., Random Access Memory (RAM), Read-Only Memory (ROM), Non-Volatile RAM (NVRAM), flash memory, hard disk storage, etc.) stores data and/or computer code for facilitating the various processes described herein. Moreover, the memory 403 is or includes tangible, non-transient volatile memory or non-volatile memory. Accordingly, the memory 403 includes database components, object code components, script components, or any other type of information structure for supporting the various activities and information structures described herein. The processing circuit 401 can be used to implement or control one or more of the circuits or systems 404, 405, 406, and 407.

The network interface circuit 404 is configured for and structured to establish and implement one or more communication links with user devices. For example, the network interface circuit 404 can establish one or more communication links with network interface circuits 424 of a message node 110 (e.g., a next hop) in the manner described to send data to and receive data from the message node 110 in the manner described. Accordingly, the network interface circuit 404 includes any of a cellular transceiver (for cellular standards), wireless network transceiver (for 802.11X, ZigBee, Bluetooth, Wi-Fi, or the like), satellite communication transceiver (for satellite communication standards), or a combination thereof. For example, the network interface circuit 404 may include wireless network modems, ports, baseband processors, and associated software and firmware.

The cryptography circuit 405 is configured to translate the encrypted message element from being encrypted using the DUK of one node to being encrypted using the DUK of another node and protect the translated and encrypted message element, in the manner described herein. In that regard, the cryptography circuit 405 is configured to perform cryptographic operations such as deriving a DUK, encrypting data, decrypting data, encrypting another cryptographic material (e.g., another cryptographic key), decrypting another cryptographic material, signing data, verifying data, signcrypting data, and so on.

The attribute mapping table 406 can be stored in a suitable database or memory. The attribute mapping table 406 provides attribute mapping of the ID, name, and attributes of the sender message nodes, ID, name, and attributes of the recipient message nodes, and attributes of various message elements. As described, in response to receiving a key translation request from a message node 110 including attributes of one or more of the sender node, the receiver node, and message component or encrypted message component, the attribute mapping table 406 can queried or looked up according to those attributes to determine whether key translation is allowed.

The key management node 120 can further include the TSA 407. Alternatively, the key management node 120 can be communicable coupled to the TSA 406 via a suitable network. The TSA 407 can generate the TST in the manner described.

The message node 110 can include a suitable computing system such as a desktop computer, laptop computer, smart phone, tablet, server, on-premise computing system, datacenter, cloud computing system, and so on. The message node 110 is shown to include various circuits and logic for implementing the operations described herein. More particularly, the message node 110 includes one or more of a processing circuit 421, a network interface circuit 424, a cryptography circuit 425, and an application circuit 426. While various circuits, interfaces, and logic with particular functionality are shown, it should be understood that the message node 110 includes any number of circuits, interfaces, and logic for facilitating the operations described herein. For example, the activities of multiple circuits are combined as a single circuit and implemented on a same processing circuit (e.g., the processing circuit 421), as additional circuits with additional functionality are included.

In some arrangements, the processing circuit 421 has a processor 422 and memory 423. The processor 422 is a processing component such as the processor 402. The memory 423 is a memory device such as the memory 403. The processing circuit 421 can be used to implemented one or more of the circuits 424, 425, and 426.

The network interface circuit 424 is configured for and structured to establish and implement one or more communication link with the network interface 404 of the key management node 120 or the network interface 424 of another message node 110. Accordingly, the network interface circuit 424 includes any of a cellular transceiver (for cellular standards), wireless network transceiver (for 802.11X, ZigBee, Bluetooth, Wi-Fi, or the like), satellite communication transceiver (for satellite communication standards), or a combination thereof. For example, the network interface circuit 424 may include wireless network modems, ports, baseband processors, and associated software and firmware.

The cryptography circuit 425 is configured for deriving a DUK, encrypting data, decrypting data, encrypting another cryptographic material (e.g., another cryptographic key), decrypting another cryptographic material, verifying data, verifying a signature and decrypting data, and so on in the manner described. The application circuit 426 executes an application, software, firmware, or code for which cryptographic operations are needed to derive a DUK, encrypt data, decrypt data, encrypt another cryptographic material, decrypt another cryptographic material, sign data, verify data, signcrypt data, verifying a signature and decrypting data, and so on. For example, the application circuit 426 can execute processes and operations relating to a merchant, acquirer, payment network, privacy supplier, issuer, Point of Sale (POS), mobile banking application, mobile wallet, browser, word processing application, a mobile banking application, a mobile wallet, a Graphic User Interface (GUI), an email reader/client, a File Transfer Protocol (FTP) client, a virtual machine application, and so on. For example, application circuit 426 can execute an application, software, firmware, or code for which data (e.g., message, code, document, file, program or application, etc.) needs to be encrypted, decrypted, signed, or for which a signature on the signed data needs to be verified.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:

receiving, by a key management node from a second node, a first encrypted message element, wherein the first encrypted message element is encrypted using a first symmetric key established between the key management node and a first node;

decrypting, by the key management node, the first encrypted message element using the first symmetric key to obtain a first message element of a message;

encrypting, by the key management node, the first message element using a second symmetric key established between the key management node and a second node to obtain a second encrypted message element; and sending, by the key management node to the second node, the second encrypted message element, wherein the second node decrypts the second encrypted message element to obtain the first message element.

2. The method of claim 1, wherein the first symmetric key comprises a Derived Unique Key (DUK) derived by the key management node and the first node using a Derived Unique Key Per Transaction (DUKPT) protocol, and the second symmetric key comprises a DUK derived by the key management node and the second node using the DUKPT protocol;

the first symmetric key comprises a Derived Unique Key (DUK) derived by the key management node and the first node using a Unique Key Per Transaction (UKPT) protocol, and the second symmetric key comprises a DUK derived by the key management node and the second node using the UKPT protocol; or the first symmetric key comprises a key derived by the key management node and the first node using a distributed Quantum Key Distribution (dQKD) protocol, and the second symmetric key comprises a key derived by the key management node and the second node using the dQKD protocol.

3. The method of claim 1, further comprising:

determining, by the key management node, the first symmetric key using an identifier of the first node and a first counter; and determining, by the key management node, the second symmetric key using an identifier of the second node and a second counter.

4. The method of claim 1, further comprising:

determining, base at least in part of an attribute of the first node, that the first node is authorized access the first message element, and in response to determining that authorized access the first encrypted message element, at least one of decrypting the first encrypted message element, encrypting the first message element, or sending the second encrypted message element.

5. The method of claim 1, wherein the second node receives a first encrypted message from the first node, the first encrypted message comprises the first encrypted message element.

6. The method of claim 1, wherein the second node sends a second encrypted message to a third node, the second encrypted message comprises the second encrypted message element.

7. The method of claim 1, further comprising:

receiving, by the key management node from the second node, a third encrypted message element, wherein the third encrypted message element is encrypted using a third symmetric key established between the key management node and a third node;

decrypting, by the key management node, the third encrypted message element using the third symmetric key to obtain a second message element of the message;

encrypting, by the key management node, the second message element using a fourth symmetric key established between the key management node and the second node to obtain a fourth encrypted message element; and sending, by the key management node to the second node, the fourth encrypted message element, wherein the second node decrypts the fourth encrypted message element to obtain the second message element.

8. The method of claim 7, wherein the second node receives a first encrypted message from the first node, the first encrypted message comprises the first encrypted message element and the third encrypted message element.

9. The method of claim 7, wherein the second node sends a second encrypted message to a third node, the second encrypted message comprises the second encrypted message element and the fourth encrypted message element.

10. A system, comprising at least one processor configured to:

receive a first encrypted message element from a second node, wherein the first encrypted message element is encrypted using a first symmetric key established between the key management node and a first node;

decrypt the first encrypted message element using the first symmetric key to obtain a first message element of a message;

encrypt the first message element using a second symmetric key established between the key management node and a second node to obtain a second encrypted message element; and send the second encrypted message element to the second node, wherein the second node decrypts the second encrypted message element to obtain the first message element.

11. The system of claim 10, wherein the one or more processors are to:

determine the first symmetric key using an identifier of the first node and a first counter; and determine the second symmetric key using an identifier of the second node and a second counter.

12. At least one non-transitory processor-readable medium comprising processor-readable instructions, such that, when executed, causes at least one processor to:

receive a first encrypted message element from a second node, wherein the first encrypted message element is encrypted using a first symmetric key established between the key management node and a first node;

decrypt the first encrypted message element using the first symmetric key to obtain a first message element of a message;

encrypt the first message element using a second symmetric key established between the key management node and a second node to obtain a second encrypted message element; and send the second encrypted message element to the second node, wherein the second node decrypts the second encrypted message element to obtain the first message element.

13. The non-transitory processor-readable medium of claim 12, wherein the first symmetric key comprises a Derived Unique Key (DUK) derived by the key management node and the first node using a Derived Unique Key Per Transaction (DUKPT) protocol, and the second symmetric key comprises a DUK derived by the key management node and the second node using the DUKPT protocol;

the first symmetric key comprises a Derived Unique Key (DUK) derived by the key management node and the first node using a Unique Key Per Transaction (UKPT) protocol, and the second symmetric key comprises a DUK derived by the key management node and the second node using the UKPT protocol; or the first symmetric key comprises a key derived by the key management node and the first node using a distributed Quantum Key Distribution (dQKD) protocol, and the second symmetric key comprises a key derived by the key management node and the second node using the dQKD protocol.

* * * * *